Patented Apr. 7, 1953

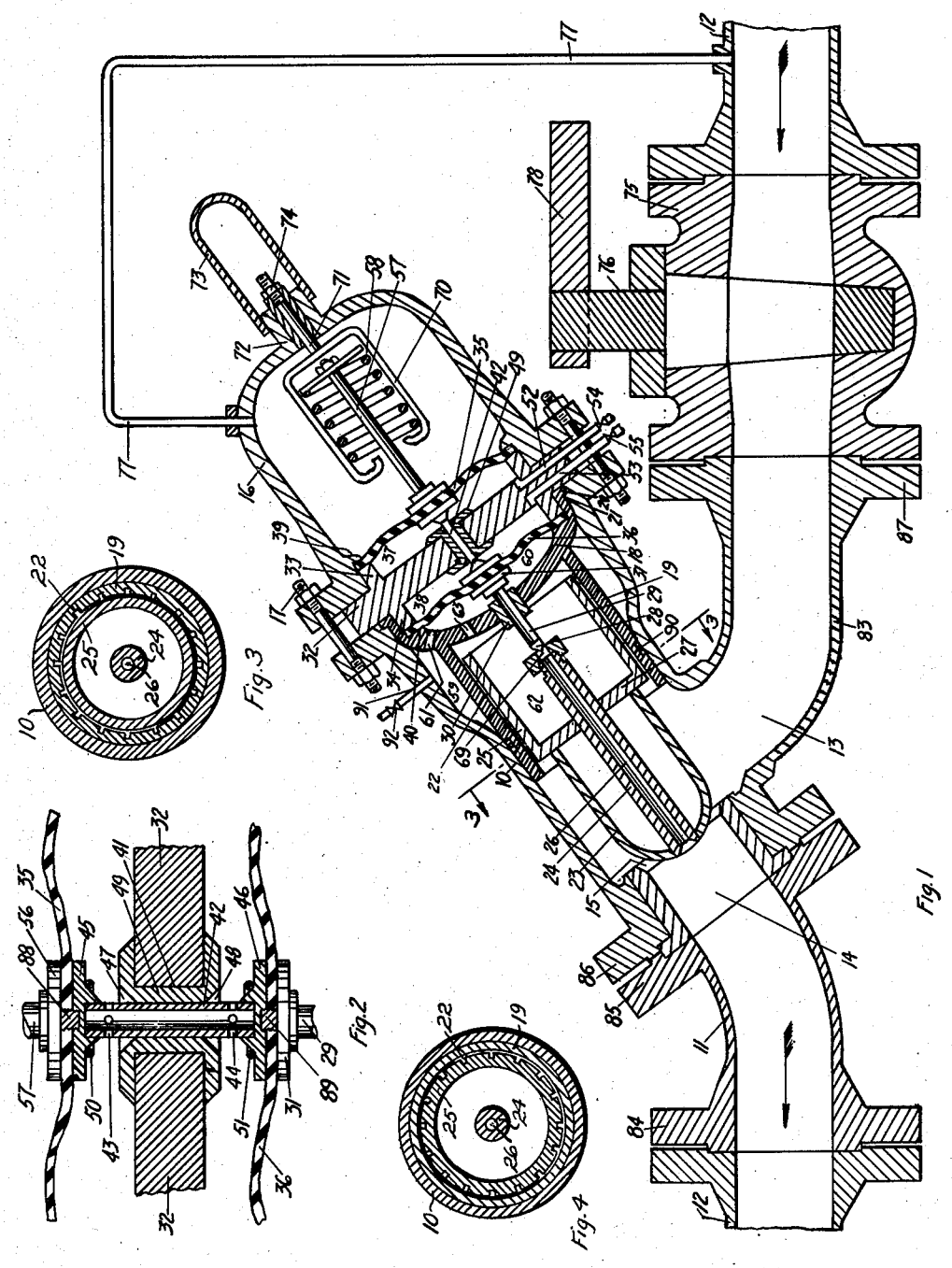

2,633,869

UNITED STATES PATENT OFFICE 2,633,869

CONCENTRIC PILOT VALVE FLOW REGULATOR

Norris Plank, East Chicago, Ind., assignor to Shell Development Company, San Francisco, Calif., a corporation of Delaware Application December 18, 1948, Serial No. 66,036

3 Claims. (Cl. 137—486)

This invention relates to pressure-responsive flow regulators and pertains more particularly to self-energized flow regulators for use in controlling and maintaining predetermined or constant and preferably substantially high rates of flow in fluid flow lines.

In order to secure close and sensitive pressure control in pipe lines, numerous types of pilot-operated flow regulators have been designed. However, the location and operating conditions of many fluid flow lines, e. g., petroleum pipe lines, often render the use of most types of flow regulators impractical and inadequate. In general, these regulators are actuated by pilot valves requiring the use of an auxiliary pressure fluid, such as, for example, air, oil, or any other suitable fluid. Since the installation of an individual pneumatic or hydraulic system at each valve or regulator in a cross-country pipe line entails considerable expense and maintenance, it is desirable to install self-energized regulators, especially at the more isolated locations. These regulators must be of rugged construction so as to withstand and control high pressures and rates of flow, e. g., 1000 p. s. i. and 1000 G. P. M., respectively. Most of the present self-energized flow regulators are only designed to control relatively low rates of flow and would be damaged or made inoperative by high pressures and especially by high pressure surges.

It is, therefore, an object of this invention to provide a flow regulator for fluid conduits that is self-energized in that its operation is responsive to and controlled by the flow in the fluid conduit and is independent of any auxiliary pneumatic or hydraulic control means.

It is also an object of the present invention to provide a self-energized flow regulator of a simple and sturdy design for use in pipe line systems handling high pressures or rates of flow.

It is a further object of this invention to provide a self-energized flow regulator adapted to dampen and stop high pressure surges in a pipe line.

Another object of the present invention is to provide a self-energized flow regulator of the diaphragm type which is responsive to the differences between the pressures upstream and downstream of an orifice means associated with the regulator, the diaphragm of said regulator being adequately protected against damage or permanent distortion by high pressure surges.

Other objects and advantages of the invention will become apparent from the following detailed description taken with references to the drawing wherein:

Figure 1 is a diagrammatic view in cross section, of a preferred embodiment of a flow regulator of the present invention.

Figure 2 is a cross-sectional view of the valve and conduit means with the diaphragm means of the present regulator.

Figure 3 is a cross-sectional view taken along the line 3—3 of Figure 1 illustrating the fluid passageways 22 in the inner wall of the guide cylinder.

Figure 4 is a cross-sectional view taken along the line 3—3 of Figure 1 illustrating an alternative structure with the fluid passageways 22 being cut in the outer wall of the piston 25.

Referring to Figure 1 of the drawing, the pressure regulator of the present invention is shown having a flanged housing 10 adapted to be installed in a fluid flow line 12, such as, for example, a petroleum products pipe line. This installation may be effected by any desired means comprising, for example, elbows 11 and 83 and flanges 84, 85, 86 and 87. The housing 10 has a fluid inlet port 13 and a fluid outlet port 14 with a preferably beveled valve seat 15 formed around said fluid outlet port inside said housing. The open top of the housing 10 is flanged, whereby a flanged bonnet 16 may be secured thereto by bolts 17. Positioned in any suitable manner within the housing 10 is a diaphragm casing 18 having a guide cylinder 19, preferably attached to or formed on the bottom of said casing. In the embodiment of Figure 1, the top of the diaphragm casing 18 has a circular flange 20 that rests on a shoulder 21 in the housing 10. Preferably, the guide cylinder 19 is sealed in a fluidtight manner within the housing 10 by an O ring seal 90 positioned therebetween.

The main valve assembly comprises any suitable closure means such as a valve or plug 23 mounted around a valve stem 24, said valve and valve stem being fixedly secured to a guide piston member 25 mounted for sliding movement within the guide cylinder 19. Extending through the valve stem 24 and plug 23 is a small fluid conduit or channel means 26 in communication between the downstream side of the valve plug 23 and the inside of the guide piston member 25. The guide piston member 25 is in the form of a hollow cylinder having a closed end 27, the opposite sides of which serve as the two faces of the piston. Longitudinal grooves or other suitable conduit means are cut in the outer wall of the piston 25 (Figure 4) or the inner wall of the guide cylinder 19 forming passageways 22 between said piston 25 and cylinder 19 (Figure 3) to allow fluid to enter said piston 25 and casing 18.

The hollow piston member 25 contains a needle valve assembly therein for controlling fluid flow through the fluid conduit 26. This assembly comprises a valve stem 24, which may extend into the piston member 25 and have an orifice 69 at its extended end adapted to be closed by a small plug or needle-type valve 28 secured to one end of a valve stem 29. The valve stem 29 is mounted for sliding movement in a bushing 30 positioned centrally of the diaphragm casing 18. A diaphragm contact disc 31 is secured to the other end of the valve stem 29 of the needle valve 28.

The diaphragm assembly comprises a central support plate 32 having raised annular flanges 33 and 34 upon which a pair of flexible diaphragms 35 and 36 may be positioned or secured in spaced relationship to said plate 32 so as to form fluid-tight chambers 37 and 38 on opposite sides thereof. The diaphragms 35 and 36 may be made of any flexible material, such as, for example, rubber, rubberized canvas, sheet metal, or the like, which may be secured in any suitable manner, as by cementing, soldering, etc., to the flanges 33 and 34. In the embodiment of Figure 1, shoulders 39 and 40 are formed or machined in the bonnet 16 and diaphragm casing 18, respectively, so that when the bonnet 16 is bolted in place, the upper diaphragm 35 is clamped between flanges 33 and shoulder 39 while the lower diaphragm 36 is clamped between flange 34 and the adjacent shoulder 40.

Centrally located in a hole 41 in the center of the support plate 32 is a bushing 49 in which a tubular dual valve stem 42 is slidably mounted, as shown in detail in Figure 2. Perforations 43 and 44 in the wall of said tubular valve stem 42, and near either end thereof, permit fluid circulation from one side of the support plate 32 to the other. Secured to the ends of the valve stem 42 on opposite sides of said plate 32 and spaced therefrom are suitable valve-closure means, such as, for example, valve plates 45 and 46, formed so as to fit tightly against the beveled valve seats 47 and 48 around the edges of the hole in the bushing 49 when forced thereagainst. A more positive seal between the valves and their seats may be secured by the use of rubber ring seals 50 and 51 suitably secured to the valve plates. The overall length of the valve stem 42 and the attached valve plates 45 and 46 is preferably the same as the distance between the diaphragms 35 and 36 so that the valve plates contact their adjacent diaphragms. Both chambers 37 and 38 of the diaphragm assembly are filled with any suitable clean fluid such as oil, said fluid being relatively incompressible, of a constant viscosity and having a low freezing point. The diaphragm assembly may be filled through one of the conduits 52 or 53 which are normally closed by valves 54 and 55.

A second diaphragm contact disc 56 is mounted at the end of a slidable rod 57 which is centrally positioned in the bonnet 16. The disc 56 and rod 57 may be secured through diaphragm 35 to valve plate 45 in any suitable manner as by a screw 88. Rod 29 and disc 31 may be secured, in a similar manner, through diaphragm 36 to valve plate 46 by screw 89. Surrounding the rod 57 and mounted between the bonnet 16 and the disc 56 is a diaphragm spring 58 which is arranged to pull the diaphragm unit up and lift the needle valve 28 off its seat in the piston chamber when the pressure above and below the diaphragm unit is equalized. A yoke 70, having an extended threaded rod 71 fixedly attached thereto, is mounted about the spring 58. The rod 71 extends through, and is suitably packed within, a nipple 72 in the bonnet 16, said nipple having a cover 73. A nut 74 on said rod 71 serves to adjust the tension on said spring 58.

The space 59 within the housing 18 is in communication with the space 60 within the diaphragm casing 18 through one or more ports 61, while the space 60 is in communication with the space 62 inside the hollow piston 25 through a port 63 of predetermined size. A drain outlet 91 in said housing 18 normally closed by a valve 92 permits air to be bled from said housing when the regulator is put into service. The rate of fluid flow into the hollow piston 25 is controlled by the size of the grooves 22 in the wall of the piston 25 or cylinder 19.

To create a head loss or differential pressure in the fluid flow line 12, any suitable orifice may be inserted in the flow line on the upstream side of the valve. In the embodiment illustrated, a plug valve 75 is employed having an adjustable apertured plug 76 and an operating handle 78. The bonnet 16 of the regulator is in communication through a conduit 77 with flow line 12, upstream of plug valve 75.

To illustrate the use of the flow regulator of the present invention, its operation when used in rate-of-flow controlling service is described hereinbelow. In all instances all portions of the flow regulator, with the exception of the diaphragm assembly, are filled with the fluid entering the regulator from the fluid pipe line 12. As hereinabove mentioned, the diaphragm assembly is filled with a separate fluid and is sealed so that none of this fluid can escape, thus forming an independent fluid system that is affected only when pressure is applied to either diaphragm 35 or 36. For example, when pressure is applied to the outer surface of the lower diaphragm 36, the pressure will bend the flexible diaphragm toward the central support plate 32 and the fluid in the compartment 38 between said diaphragm and said plate will be forced through the perforations 44, tubular valve stem 42 and perforation 43 into the compartment 37 on the opposite side of the plate 32 thus causing a corresponding movement of the upper diaphragm 35. Since the tubular valve stem 42 is slidably mounted in the bushing 49, it will also be moved with the diaphragms 35 and 36 until the valve 46 contacts the valve seat 48, which closes the perforations 44 and prevents any more fluid from being forced through the valve stem 42. Thus, when the valve 46 is closed, continued or increased pressure on the lower diaphragm 36 does not change the pressure against the upper diaphragm 35, which prevents it from being injured or damaged, while the fluid trapped between the lower diaphragm 36 and the plate 32 prevents rupture of said lower diaphragm.

Since the perforations 43 and 44 in the tubular valve stem 42 are relatively small in size, the flow of fluid from one side of the diaphragm assembly to the other is restricted. Thus, any sudden pressure imparted to the lower diaphragm 36, such as that caused by the surging of a fluid through the regulator, is damped by the action of the diaphragm assembly so that the regulator is not injured.

When a flow regulator of the present invention has been installed in a fluid pipe line 12 adjacent a plug valve 75, fluid from said line 12 passes through the open plug 76 of the valve 75, enters the fluid inlet 13 of the flow regulator and fills all portions of the regulator housing 10. Fluid travels through passageways between the outer wall of the piston 25 and inner wall of cylinder 19 into chamber 62 and thence through port 63 into chamber 60, thus subjecting the lower diaphragm 36 to the line pressure on the downstream side of the plug valve 75. Fluid enters the hollow piston 25 of the regulator through port clearance passage so that when the needle valve 28 is closed, line pressure on the downstream side of the plug valve 75 is applied to both sides of the transverse plate element 27 of the piston 25.

There is also a flow of fluid through conduit 77 between the bonnet 16 of the flow regulator and the fluid flow line 12 upstream of the plug valve 75. Thus the upper and lower sides of the diaphragm assembly are subjected to the line pressures upstream and downstream of the plug valve 75, respectively. As long as these two pressures are equal, the diaphragm spring 58 is arranged to lift the diaphragms 35 and 36 upwards raising the needle valve 28, attached thereto, from its seat opening orifice 69. Thus, the fluid inside the hollow piston 25 is allowed to flow through the orifice 69 and conduit 25 in the stem 24 of the main valve 23 to the downstream side thereof. Since the flow regulator has a needle valve orifice 69 larger than the clearance space between piston and cylinder wall, the flow rate through the needle valve exceeds the flow rate of the pressure fluid entering the hollow piston 25 thus causing the pressure inside said piston to be reduced below guide cylinder 19 thus opening the main valve 23, or moving it to a more open position if it is already open. The piston 25 moves upward until it reaches the seating position of the needle valve 28. Normally the piston 25 and attached main valve 23 follow the motion of the needle valve very closely.

In operation, the regulator valve 23 remains open as long as the plug valve 75 is open due to the reaction of the spring 58 which may be set at any predetermined tension. However, when the plug valve 75 is partially closed to create a pressure drop in the flowing stream sufficient to overcome the force of the spring 58, the diaphragm 35 and 36 and the needle valve 28 move downwards. When the needle valve seats and closes orifice 69, liquid can no longer escape through conduit 36 and the pressure on either side of the hollow piston 25 becomes equalized thus allowing any further downward movement of the diaphragms and the needle valve 28 to move the main valve 23 to a more closed position.

The rate-of-flow regulator of the present invention throttles the stream in a fluid flow line to maintain a constant pressure drop across an orifice such as the plug valve 75. The magnitude of the pressure drop may be selectively fixed at any predetermined value by the amount of force exerted by the adjustable spring 58. The area of the aperture may be adjusted manually by positioning handle. The volume rate through the flow line is determined by the area of the orifice and the valve opening. Thus the regulator valve, in combination with a suitable orifice or aperture, comprises a self-contained regulator that may be used satisfactorily as a rate-of-flow controller on high pressure pipe lines, the pressure drop across the orifice 75 being employed to actuate the needle or pilot valve 28 while the main valve 23 is operated by the fluid flow in the pipe line 12.

I claim as my invention:

1. In a pipe line flow regulator, a main valve housing, diaphragm means dividing said housing into a first and a second chamber, conduit means opening to said first chamber for supplying thereto a fluid under pressure, inlet and outlet port means to and from said second chamber, a valve member in said second chamber adapted to close the outlet port means from the upstream side thereof, piston means in said second chamber axially spaced from said diaphragm, said piston means being rigidly connected to said valve member on the upstream side thereof for reciprocating said valve member with regard to the outlet port means, one side of said piston means being directly exposed at all times to the pressure of fluid entering said inlet port means, restricted passage means in communication between said inlet port means and the space between said diaphragm means and the other side of said piston means, channel means through said valve member in communication between said space and the outlet port means, said channel means having a greater throughput than said restricted passage means, auxiliary valve means controlling the flow through said channel means, said auxiliary valve means being connected for actuation by said diaphragm means to close and open said channel means in response to increases and decreases of the pressure of the fluid within the first chamber of the valve housing, and spring means positioned to maintain a predetermined tension on said diaphragm means to hold said valve member and said auxiliary valve means normally open when no pressure differential exists across said valve member.

2. In a pipe line flow regulator a main valve housing, diaphragm means dividing said housing into a first and a second chamber, conduit means opening to said first chamber for supplying thereto a fluid under pressure, inlet and outlet port means to and from said second chamber, a valve member in said second chamber adapted to close the outlet port means from the upstream side thereof, piston means in said second chamber axially spaced from said diaphragm, said piston means being rigidly connected to said valve member on the upstream side thereof for reciprocating said valve member with regard to the outlet port means, one side of said piston means being directly exposed at all times to the pressure of fluid entering said inlet port means, restricted passage means in communication between said inlet port means and the space between said diaphragm means and the other side of said piston means, channel means through said valve member in communication between said space and the outlet port means, said channel means having a greater throughput than said restricted passage means, auxiliary valve means controlling the flow through said channel means, said auxiliary valve means being connected for actuation by said diaphragm means to close and open said channel means in response to increases and decreases of the pressure of the fluid within the first chamber of the valve housing, said diaphragm means comprising a diaphragm casing having open ends, flexible diaphragms closing said open ends, transverse plate means dividing said casing into two chambers, said chambers being adapted to be filled with a liquid, aperture means through said plate means in communication between said chambers, rigid spacing means between said diaphragms slidably mounted in said aperture means causing said diaphragms to move in unison in response to a differential pressure applied to them, flow means through said rigid spacing means, and valve means carried on said rigid spacing means for closing said aperture means when the diaphragms are subjected to excessive differential pressures.

3. In a pipe line flow regulator, a main valve housing, diaphragm means dividing said housing into a first and a second chamber, conduit means opening to said first chamber for supplying thereto a fluid under pressure, inlet and outlet port means to and from said second chamber, a valve member in said second chamber adapted to close the outlet port means from the upstream side thereof, piston means in said second chamber axially spaced from said diaphragm, said piston means being rigidly connected to said valve member on the upstream side thereof for reciprocating said valve member with regard to the outlet port means, one side of said piston means being directly exposed at all times to the pressure of fluid entering said inlet port means, restricted passage means in communication between said inlet port means and the space between said diaphragm means and the other side of said piston means, channel means through said valve member in communication between said space and the outlet port means, said channel means having a greater throughput than said restricted passage means, auxiliary valve means controlling the flow through said channel means, said auxiliary valve means being connected for actuation by said diaphragm means to close and open said channel means in response to increases and decreases of the pressure of the fluid within the first chamber of the valve housing, said diaphragm means comprising two spaced diaphragms, rigid plate means parallel to said diaphragms dividing the space therebetween into two fluidtight chambers adapted to contain a pressure fluid, aperture means through said plate means in communication between said fluidtight chambers, and valve means for closing said aperture means when the diaphragm means are subjected to excessive differential pressure.

NORRIS PLANK.

REFERENCES CITED

The following references are of record in the file of this patent:

UNITED STATES PATENTS

| Number | Name | Date |
| --- | --- | --- |
| 750,752 | Cole | Jan. 26, 1904 |
| 1,925,301 | Campbell | Sept. 5, 1933 |
| 2,146,176 | Donaldson | Feb. 7, 1939 |
| 2,381,429 | Bell | Aug. 7, 1945 |
| 2,400,048 | Jones | May 7, 1946 |